United States Patent [19]

Stasch

[11] Patent Number: 4,660,133

[45] Date of Patent: Apr. 21, 1987

[54] SWITCHED POWER PACK WITH FREE-WHEELING FLOW CONVERTER AND SWITCHED CONTROLLER AT A SECONDARY SIDE

[75] Inventor: Harald Stasch, Neuried, Fed. Rep. of Germany

[73] Assignee: Siemens Aktiengesellschaft, Berlin and Munich, Fed. Rep. of Germany

[21] Appl. No.: 762,516

[22] Filed: Aug. 5, 1985

[30] Foreign Application Priority Data

Aug. 7, 1984 [DE] Fed. Rep. of Germany ....... 3429100

[51] Int. Cl.[4] .......................................... H02M 3/338
[52] U.S. Cl. .................................... 363/19; 323/266; 363/37
[58] Field of Search .................. 363/18, 19, 21, 37, 363/97; 331/112; 323/266, 271, 282, 284

[56] References Cited

U.S. PATENT DOCUMENTS 4,449,173  5/1984  Nishino et al. .................. 363/21
4,573,112  2/1986  Numata et al. .................. 363/97

FOREIGN PATENT DOCUMENTS 2613806  8/1977  Fed. Rep. of Germany ........ 363/21
2608167  9/1977  Fed. Rep. of Germany .
3134599  6/1983  Fed. Rep. of Germany ........ 363/21
WO82/03302  9/1982  Int'l Pat. Institute .
4820  1/1981  Japan ........................ 363/21
WO82/1627  5/1982  PCT Int'l. Appl .............. 363/19

OTHER PUBLICATIONS

"Schaltnetzteile" by Joachim Wustehube, 1979, Expert-Verlag, Chapter 2.1.

Primary Examiner—William H. Beha, Jr.

[57] ABSTRACT

A switched power supply has a rectifier arrangement for generating a DC voltage from an input AC voltage. A converter arrangement thereof has a switching transistor and a transformer. The converter arrangement is designed as a free-running flow converter wherein the switching transistor is switched on in a current-free condition. A secondary side of the converter arrangement comprises a secondary switch controller which is synchronized by the transformer and which regulates an output DC voltage.

7 Claims, 1 Drawing Figure

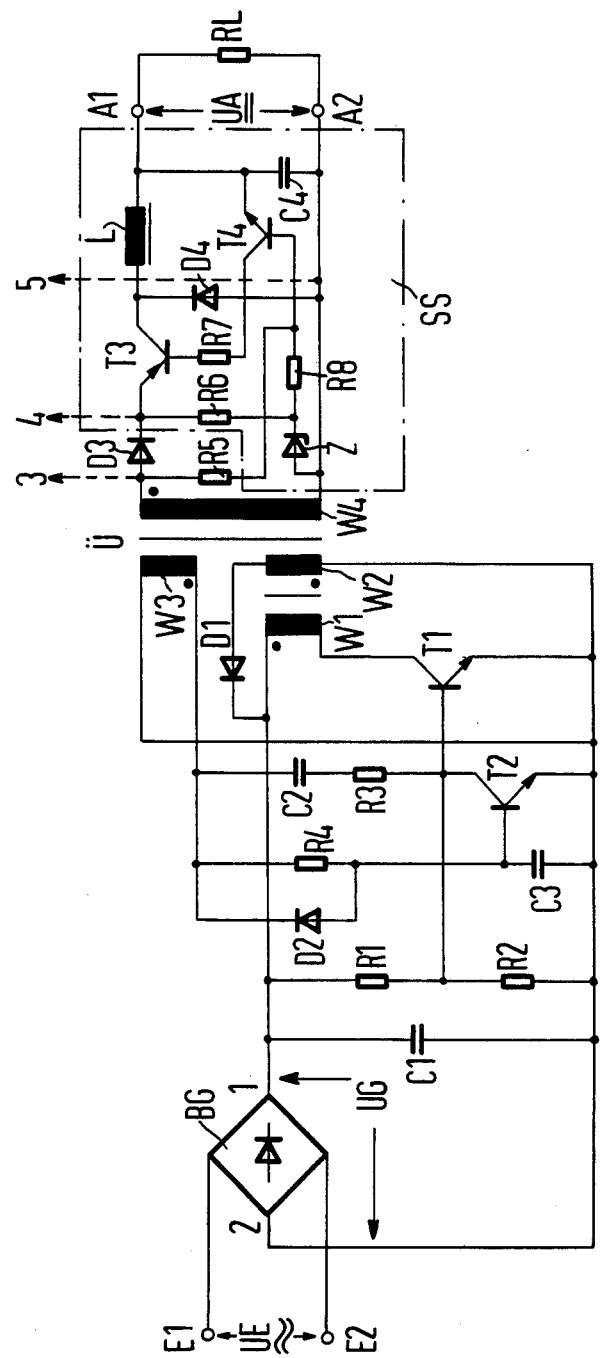

SWITCHED POWER PACK WITH FREE-WHEELING FLOW CONVERTER AND SWITCHED CONTROLLER AT A SECONDARY SIDE

RELATED APPLICATIONS

This application is related to the following application of the same assignee: "Switched Power Supply Comprising A Free-Running Flow Converter And Electrically Separated Control Loop", U.S. application Ser. No. 762,515, filed Aug. 5, 1985.

BACKGROUND OF THE INVENTION

The invention relates to a switched power supply having a rectifier for generating a d.c. voltage from an input a.c. voltage and a converter arrangement having a switching transistor and transformer.

Switched power supplies are presently employed to a great degree for power supply systems, since they are lighter, smaller, and cheaper to manufacture in comparison to 50 Hz power supplies.

Universally known switched power supplies comprise a transformer whose primary-side winding is charged with energy by means of a switching transistor and at whose secondary-side winding or windings this energy is taken in the form of one or more constant voltages. The transformer is a component of a flow transformer or of a blocking oscillator. The structure and functioning of these transformer types are extensively described in the book "Schaltnetzteile" by Joachim Wustehube, 1979, Expert-Verlag, Chapter 2.1, incorporated herein by reference.

Switched power supplies usually work in a frequency range from 16 to 500 kHz. Since the occurring current or voltage curves have large overshooting components and, moreover since high currents and voltages must be switched, one must still count on considerable disruptions in the frequency range above 10 kHz (long wave). There are binding laws and regulations for the frequency response of these disruptions relative to the possible propagation in public networks or broadcast into the airwaves.

For the suppression of asymmetrical noise voltages in the network, transformers in switched power supplies have a shielding between the primary and the secondary side. The shielding is composed, for example, of a copper foil which is placed over the primary winding in insulated fashion.

Blocking oscillator power supplies comprise a transformer with an air gap. Particularly given high powers, high eddy current losses arise in the transformer cores of the transformers and in the shielding. It is therefore generally standard (see, for example Wustehube) to employ a so-called conductive fleece for the shielding instead of the copper foil. The manufacture of such a transformer for a blocking oscillator is therefore involved and expensive.

Known flow transformers comprise essentially fixed-clock-controlled, periodically functioning switching transistors as well as a transformer without an air gap whose primary winding is in the collector circuit of the switching transistor and at whose secondary winding a DC voltage can be tapped via a rectifier arrangement. Since a prescribed sampling frequency is used given this circuit principle, the point in time of the cut-in of the switching transistor is predetermined. This circuit principle has the disadvantage that the switching transistor is switched on under power and a free-wheeling diode in the secondary circuit switches into the inhibited condition under power. This leads to high radio interference voltages on the network line. When these converter circuits are utilized in text terminal equipment of communication technology with electrical separation according to protective class 2, i.e. are used without a grounded conductor, then these devices cannot be radio-shielded to the required radio interference level as set by a limiting value in class B.

It is known in switched power supplies for maintaining the output voltage output at the secondary side, to regulate the ratio of on time to off time, or the ratio of on time to the sum of on time and off time, i.e. to regulate the so-called pulse duty factor for the switching transistor.

SUMMARY OF THE INVENTION

An object of the invention is to specify a switched power supply with electrical separation wherein only slight noise pulses appear on the connecting lines, which comprises a transformer with low eddy current losses, and which emits a regulated output voltage.

This object is achieved in accordance with the invention by providing the converter as a free-wheeling flow converter and providing means for switching on the switching transistor in a current-free condition thereof. A secondary side of the converter has a secondary switch controller synchronized by the transformer for controlling an output d.c. voltage.

One advantage of the switched power supply of the invention is that the free-running flow converter causes a triangular collector current in the switching transistor, whereby the converter is easily radio-shielded.

An output voltage regulation without a control loop is possible due to the switching regulator positioned at the secondary side.

The switching losses are reduced since the switching transistor is not switched on under power.

A metal foil which is easy to process can be employed for shielding the primary winding of the transformer since the switched power supply of the invention comprises a flow converter.

By means of a synchronizing resistor, the secondary switching transistor is switched conductive at the beginning of the conductive phase of the switching transistor.

BRIEF DESCRIPTION OF THE DRAWINGS

The drawing illustrates schematically the switched power supply according to the invention.

DESCRIPTION OF THE PREFERRED EMBODIMENTS

The switched power supply shown in the drawing comprises a flow transformer having two input posts E1, E2 at which an input alternating voltage UE is present.

A bridge rectifier BG converts this input AC voltage UE into a DC voltage UG and emits this to two terminals 1, 2, whereby a potential which is positive with respect to terminal 2 is output at terminal 1. The DC voltage UG is smoothed by a capacitor C1 connected between the terminals 1 and 2. Also, connected between the terminals 1 and 2 are a series connection of two resistors R1, R2 and the series connection formed of a primary winding W1 and the collector-emitter portion of a switching transistor T1. A voltage divider point (not referenced in detail) between the resistors R1 and R2 is connected to the base of the switching transistor T1.

The primary winding W1, a de-magnetization winding W2, a control winding W3, and a secondary winding W4 are component parts of a transformer U. The primary winding W1 and the secondary winding W4 respectively exhibit the same winding sense; the control winding W3 and the de-magnetization winding W2 exhibit the opposite winding sense. The de-magnetization winding W2 is connected in series with a diode D1 between the two terminals 1 and 2, whereby the cathode of the diode D1 is connected to terminal 1.

The collector-emitter portion of a control transistor T2 is connected between the base of the switching transistor T1 and the terminal 2. The base of the control transistor T2 is connected to the terminal 2 via a capacitor C3 and via the series connection of a resistor R4 and of the control winding W3. Connected parallel to the resistor R4 is a diode D2 whose anode is connected to the base of the control resistor T2. The cathode of the diode D2 is connected to the base of the switching transistor T1 via the series connection of a capacitor C2 and a resistor R3.

Together with the capacitor C2, the resistor R3 forms the turn-on stage and the capacitor C3 together with the resistor R4 and the control transistor T2 as well as the diode D2 form a turn off stage for the switching transistor T1.

A secondary switch controller SS, a rectifier diode D3, and a resistor R5 are provided at the secondary side. The one end of the secondary winding W4 is connected via the rectifier diode D3, the emitter-collector portion of a secondary switching transistor T3, and a storage inductance L to an output terminal A1. The other end of the secondary winding W4 is directly connected to an output terminal A2 which is connected to the collector of the secondary switching transistor T3 via a free-wheeling diode D4 polarized in a flow direction. A capacitor C4 is connected between these components for smoothing an output DC voltage UA which can be obtained at the output terminals A1, A2. Furthermore, a load resistor RL, which symbolically represents an external user, is connected between the output terminals A1 and A2.

The emitter of the secondary switching transistor T3 to which the cathode of the rectifier diode D3 is wired is connected via a resistor R6 to the cathode of a Zener diode Z whose anode is wired to the output terminal A2. The base of the secondary switching transistor T3 is connected via a resistor R7 and via the collector-emitter portion of a transistor T4 to the output terminal A1. The anode of the rectifier diode D3 is connected via the resistor R5 to the base of the transistor T4, and is further connected via a resistor R8 to the cathode of the Zener diode Z. The anode of the rectifier diode D3 is connected to a terminal 3, its cathode is connected to a terminal 4, and the output terminal A2 is connected to a terminal 5.

Further, secondary switch controllers are connectible to the terminals 3, 4, and 5. These further secondary switch controllers have the secondary winding W4, the rectifier diode D3, and the output terminal A2 in common.

The functioning of the switched power supply of the invention shall be described below.

The rectified input AC voltage UE, i.e. the DC voltage UG, is converted into a clocked voltage with the primary winding W1 of the transformer U and with the switching transistor T1. When the switched power supply is switched on, the capacitor C2 is charged via the resistors R1 and R3 and via the control winding W3. When the threshold voltage at the base of the switching transistor T1 is reached, this is switched on and the flow converter begins to work.

During the conductive phase of the switching transistor T1, energy is transmitted to the secondary side of the transformer U. At the same time, the rectifier diode D3 and the secondary switching transistor T3 are conductive and the free-wheeling diode D4 is inhibited. A current thus flowing through the inductance L enables the output Dc voltage UA to be obtained at the capacitor C4. While the current is flowing, it is not only the load resistor RL which absorbs energy, but the inductance L also absorbs energy, storing this as magnetic energy. The peak value of the current in the primary circuit is defined by the inductance L, by the sum of the loss resistances in the primary and secondary circuit, by the on duration of the switching transistor T1, and by the value of the output DC voltage UA.

The functioning of the secondary switched controller SS is known per se. When the output DC voltage UA obtainable at the output terminals A1 and A2 drops, the secondary switching transistor T3 is switched conductive via the transistor T4 during the conductive phase of the switching transistor T1, i.e. given a voltage at the emitter of the secondary switching transistor T3. When the output DC voltage UA exceeds a threshold prescribed by the Zener diode Z and the base-emitter portion of the transistor T4, the transistor T4, and thus secondary switching transistor T3 as well, are inhibited. The current flowing through the load resistor RL is thus maintained by the free-wheeling diode D4 and the inductor L.

In accordance with the invention, the rectifier diode D3 and the resistor R5 are provided at the secondary side of the switched power supply. The rectifier diode D3 serves for generating a pulsating DC voltage present at the input of the secondary switch controller SS, i.e. at the emitter of the secondary switching transistor T3. The resistor R5 serves for the synchronization of the secondary switch controller SS. Via this synchronizing resistor R5, the transistor T4, and thus the secondary switching transistor T3 as well, are switched conductive at the beginning of the conductive phase of the switching transistor T1. It is guaranteed in this fashion that the inductance L can accept energy immediately at the beginning of the energy transmission onto the secondary side.

Likewise during the conductive phase of the switching transistor T1, the capacitor C3 at the primary side of the transformer U is charged by the resistor R4 by the current induced in the control winding W3. After the charging of the capacitor C3 to the threshold voltage of the base of the controlled transistor T2, this is switched conductive in pulse-like fashion and the switching transistor T1 inhibits. The on-duration of the switching transistor T1 thus is essentially defined by the time constant formed by the resistor R4 and by the capacitor C3. During the inhibit phase of the switching transistor T1, a voltage which is negative in relationship to the potential tappable at the terminal 2 of the bridge rectifier BG, is present at its base. This voltage inversion at the base of the switching transistor T1 is effected by the inversion of the voltage tappable at the control winding W3. The inhibit event in the switching transistor is initiated via the control transistor T2 and is maintained via the control winding W3 during the demagnetization.

During the inhibit phase of the switching transistor T1, the rectifier diode D3 at the secondary side of the transformer U is polarized in the reverse direction and thus is current-free. Due to the energy stored in the inductance L, current flows through this inductance, the load resistor RL, and the free-wheeling diode D4 which is now conductive, and continues to flow in the same direction. As already stated, this current flow is also maintained, when, during the conductive phase of the switching transistor T1, the secondary switching transistor T3 is inhibited in order to observe a prescribed value of the output DC voltage UA.

During the inhibit phase of the switching transistor T1, the magnetization energy absorbed by the transformer core of the transformer U during the conductive phase of the switching transistor T1 flows back into the voltage source, i.e. into the capacitor C1, as electrical current via the demagnetization winding W2 and the diode D1. After the de-magnetization of the transformer U, and in the current-free condition of the free-wheeling diode D4, the switching transistor T1 is again switched on. The negative voltage at the base of the switching transistor T1 during the inhibit phase of the switching transistor T1 is disconnected after the de-magnetization. The capacitor C2 is again charged via the resistor R3 and the control winding W3, and the switching transistor T1 is again switched conductive. The diode D2 serves for the sudden discharging of the capacitor C3 at the beginning of the inhibit phase of the switching transistor T1.

The idea underlying the switched power supply of the invention is that the turn-on time of the switching transistor T1, and thus its switching frequency, are not rigidly prescribed. The switching transistor T1 is automatically reengaged after the de-magnetization of the transformer U and in the current-free condition of the free-wheeling diode D4. It is thus guaranteed that the switching transistor T1 is not turned on under power, and that a triangular collector current flows in the primary circuit which can be easily radio-shielded.

In the switched power supply of the invention, the switching transistor T1 is switched conductive for a prescribed time. After this on-duration, i.e. during the inhibit phase of the switching transistor T1, the transformer U is demagnetized. The switching transistor T1 is again switched on after the de-magnetization and, therefore, in the current-free condition of the free-wheeling diode D4. The end of the demagnetization is thus perceived via the control winding W3.

In order to observe a constant value of the output DC voltage UA, a secondary switch controller SS with a secondary switch transistor T3 is employed whose turn-on times are synchronized via the resistor R5 with those of the switching transistor T1. The value of the output DC voltage UA is set via the pulse duty factor of the secondary switching transistor T3.

A plurality of output voltages can be regulated with high precision with this arrangement, i.e. via a plurality of secondary switch controllers connected to the terminals 3, 4, and 5.

Any controllable semiconductor switch element may be employed in the switched power supply of the invention for switching transistor T1 or secondary switching transistor T3.

Although various minor changes and modifications might be proposed by those skilled in the art, it will be understood that I wish to include within the claims of the patent warranted hereon all such changes and modifications as reasonably come within my contribution to the art.

I claim as my invention:

1. A switched power supply, comprising:
rectifier means for generating a DC voltage from an input AC voltage;
a free-wheeling flow converter connected to the DC voltage and having a switching transistor connected to a transformer having a primary winding, secondary winding, control winding, and demagnetization winding, the demagnetization winding being connected to the primary winding by a diode;
means connecting a portion of the DC voltage generated from the input AC voltage to a base of the switching transistor;
a turn-on means and turn-off means connected to the control winding for control of the switching transistor, the turn-on means switching conductive the switching transistor given a de-magnetized transformer and when the switching transistor is in a substantially current-free condition, and the turn-off means inhibiting the swithcing transistor after a prescribable on-duration by current induced in the control winding; and
a secondary side of the free-wheeling flow converter having a secondary switch controller means comprising a free-wheeling diode and associated storage inductance connected to the secondary winding for controlling an output DC voltage of the converter, resistor means being connected between the secondary winding and the switch controller means for synchronizing the switch controller means.

2. A switched power supply, comprising:
rectifier means for generating a DC voltage from an input AC voltage;
a free-wheeling flow converter connected to the DC voltage and having a switching transistor connected to a transformer;
means connecting a portion of the DC voltage generated from the input AC voltage to a base of the switching transistor;
the transformer having a control winding;
a turn-on means and a turn-off means connected to the control winding for control of the switching transistor, the turn-on means switching conductive the switching transistor given a de-magnetized transformer and when the switching transistor is in a substantially current-free condition, and the turn-off means inhibiting the switching transistor after a prescribable on-duration by current induced in the control winding; and
a secondary side of the free-wheeling flow converter having a secondary switch controller means with a free-wheeling diode and connected storage inductance for controlling an output DC voltage of the converter, resistor means being connected between the secondary side and the switch controller means for synchronizing the switch controller means.

3. A switched power supply according to claim 2 wherein the turn-on means comprises a resistor and a capacitor in series connected between the control winding and a control input of the switching transistor.

4. A switched power supply according to claim 2 wherein the turn-off means comprises a control transistor connected to a control input of the switching transistor, a capacitor and a resistor connected to a control input of the control transistor, the capacitor connecting to a reference potential and the resistor connecting to the control winding, values of the resistor and the capacitor being chosen so as to control an on-duration of the control transistor.

5. A switched power supply according to claim 4 wherein a diode is connected parallel to the resistor so as to suddenly discharge the capacitor at a beginning of a de-magnetization of the transformer.

6. A switched power supply according to claim 1 wherein a rectifier diode means for generating a pulsating DC voltage precedes an input of the secondary switch controller means at which a voltage to be regulated is present.

7. A switched power supply according to claim 2 wherein a resistor is connected between a secondary of the transformer and a control input of a secondary switching transistor arranged in the secondary switch controller means for synchronizing turn-on times of the secondary switching transistor with those of the switching transistor.

* * * * *